United States Patent [19]

Lange

[11] 4,029,514

[45] June 14, 1977

[54] METHOD OF PRECIPITATING MICROFINE SILICA USING PHOSPHATE

[75] Inventor: Klaus Robert Lange, Huntingdon Valley, Pa.

[73] Assignee: Philadelphia Quartz Company, Valley Forge, Pa.

[22] Filed: June 9, 1975

[21] Appl. No.: 584,804

Related U.S. Application Data

[63] Continuation-in-part of Ser. No. 376,269, July 3, 1973, abandoned.

[52] U.S. Cl. .................... 106/288 B; 106/308 B; 423/339; 423/335; 428/403; 428/404
[51] Int. Cl.² ............................................ C09C 1/28
[58] Field of Search .................... 423/339, 335; 106/288 B, 308 B

[56] References Cited

UNITED STATES PATENTS

| | | | |
|---|---|---|---|
| 1,270,093 | 6/1918 | Arsem et al. | 423/339 |
| 2,280,650 | 4/1942 | Kassel | 423/339 UX |
| 2,601,235 | 6/1952 | Alexander et al. | 423/339 |
| 2,940,830 | 6/1960 | Thornhill | 423/339 |
| 3,085,861 | 4/1963 | Thornhill et al. | 423/339 |
| 3,730,749 | 5/1973 | Morgan | 423/339 X |

*Primary Examiner*—Winston A. Douglas
*Assistant Examiner*—J. V. Howard
*Attorney, Agent, or Firm*—Fred Philpitt; Ernest G. Posner

[57] ABSTRACT

The addition of sodium phosphate to a dilute solution of alkali metal silicate, precipitates microfine silica that is readily dispersible.

6 Claims, No Drawings

METHOD OF PRECIPITATING MICROFINE SILICA USING PHOSPHATE

This application is a continuation-in-part of co-pending U.S. application Ser. No. 376,269 filed July 3, 1973, now abandoned.

BACKGROUND

This invention relates to a method of precipitating microfine silica. More particularly it involves preparation of silica that has phosphate ions in the surface and is therefore readily dispersible.

The preparation of finely divided or microfine silica, 10 to 1000 mu, is well known and numerous patents have issued describing such processes. An example of such a patent is U.S. Pat. No. 3,208,823, hereby incorporated by reference. This patent described methods of preparing finely divided hydrated silica by forming a protocoacervate from a soluble silicate solution using coacervating agents such as highly soluble salts, especially univalent inorganic salts; completely water miscible hydrogen bonding agents such as simple alcohols and ketones, and highly soluble nitrogen bases such as ammonia and amines. This and other precipitation methods using a coacervation step involves formation of a highly alkaline phase some of which will be in the surface of the coacervated micelles and can be formed into gel when the micelles are precipitated as silica. This gel structure prevents the use of such precipitated silica in certain applications.

SUMMARY OF THE INVENTION

I have found that readily dispersible microfine silica with no surface gel can be prepared by addition of a sodium phosphate, particularly sodium trimetaphosphate, to a dilute alkali metal silicate solution thereby precipitating the silica. Upon separating, washing and drying the product, the desired product is obtained. It is also possible to recover sodium tripolyphosphate from the liquor remaining after filtration.

THE INVENTION

The alkali metal silicate solutions employed in the process of this invention can be either sodium or potassium silicate but I prefer to use sodium silicate for reasons of economy. The $SiO_2/Na_2O$ weight ratio of these solutions can vary between 1.5 and 4.0/1.0. I prefer to use solutions with ratios of about 3 $SiO_2$/1 $Na_2O$ to facilitate washing of the alkali from the silica. The silicate solutions are employed in a dilute state containing 0.01 to 0.05g of $Na_2O$/cc.

The phosphates that can be used to precipitate silica according to the method of this invention must be sufficiently soluble to form concentrated solutions capable of coacervating a dilute sodium silicate solution. It is possible to use sodium trimetaphosphate, sodium tripolyphosphate and sodium hexametaphosphate to form the coacervate.

The process of this invention is carried out as follows. The dilute silicate is prepared and heated to a temperature of 80° to 100° C, preferably 85° to 98° C. The phosphate salt is added and the heating is continued at 85° to 98° C. The duration of the addition and heating step can be 1 to 3.5 hours. The actual addition of the phosphate salt can be made very quickly in about 1 minute or more slowly over a substantial portion of the total heating step. Sufficient of the phosphate salt is added to achieve a ratio of 0.7 to 1.2 equivalents of the phosphate salt per equivalent of $Na_2O$. The precipitated silica was filtered, washed, reslurried in aqueous $NH_3$, filtered and washed again, reslurried in water and spray dried to form the desired product. If necessary the product can be reduced in particle size by a number of standard methods.

The products of this process can have ultimate particle sizes of 20 to 800 mu, loss on ignition between 6.5 and 10.5%, loss at 105° C of 3.0 to 5.0%, pH values of 6.5 to 10, void volumes of 1.3 to 5.0 cc/g, surface areas of 25 to 600 m²/g, and pore volumes of 0.01 to 0.4 cc/g. The products contain phosphate ions in the surface and as a consequence are more dispersible than silica prepared without phosphates. The products are useful in rubber reinforcing and thickening applications.

When sodium trimetaphosphate is used as the coacervating agent, the process also produces sodium tripolyphosphate according to the following reaction.

$$Na_3P_3O_9 + Na_2O \cdot XSiO_2 \rightarrow Na_5P_3O_{10} + XSiO_2$$

The tripolyphosphate remains in the filtrate and can be recovered by crystallization.

EXAMPLES

The following examples illustrate certain embodiments of the invention and should not be considered to restrict the scope of the invention to the embodiments set forth.

EXAMPLE 1

A sodium silicate solution having an $SiO_2/Na_2O$ weight ratio of 3.22/1.0 and 8.9% $Na_2O$ was diluted to 0.02g of $Na_2O$ per cc and heated to 95° C. Sodium trimetaphosphate (STMP) was added over a period of 1 minute with agitation up to a final ratio of 1.1 equivalents of STMP per equivalent of $Na_2O$. The reaction was continued for 1 hour at 85°–98° C. Then the precipitated hydrated silica was filtered, washed, reslurried in $NH_4OH$, then filtered and washed, and finally spray dried and reductionized. The pH of the product was 9.7. Similar products were formed at 0.75 STMP/$Na_2O$ ratio and with reaction times up to 3 hours, and also with slow addition of STMP as well as various changes in the reaction procedure and drying conditions. Properties of these products are shown in Table 1.

EXAMPLE 2

A sodium silicate solution having an $SiO_2/Na_2O$ weight ratio of 3.22/1.0 and 8.9% $Na_2O$ was diluted to 0.019g of $Na_2O$ per cc and heated to 80° C. Sodium trimetaphosphate was added over a period of 10 minutes with agitation, 0.95 equivalent of STMP per equivalent of $Na_2O$ were added. The reaction was continued to 2 hours at 80° C. Then the precipitated silica was filtered, washed, reslurried in aqueous $NH_3$, filtered, washed and spray dried. The void volume of the product was 4.5 cc/g.

EXAMPLE 3

The process of Example 3 was repeated except the reaction was carried out at 90° C for an hour. The voil volume of the product is 3.22 cc/g. If the reaction was carried out at 100° C for an hour, the void volume was 3.9 cc/g.

EXAMPLE 4

A sodium silicate solution with a $SiO_2/Na_2O$ weight ratio of 3.2/1.0 and 8.9% $Na_2O$ was diluted to 0.025g of $Na_2O/cc$ and heated to 90° C. Sodium tripolyphosphate was added in a period of 5 minutes. Heating at 90° to 92° C was continued for 1 hour. 1.0 equivalent of STPP were added per equivalent of $Na_2O$. The precipitated silica was filtered, washed, reslurried in aqueous $NH_3$, then filtered and washed, separated and flash dried. The product was reductionized by air milling.

TABLE I

Representative Phosphate Coated Silicas

| STMP Na₂O | Reaction Time, Hrs. | Ultimate Particle Size, mu | Ignited Loss % | Loss at 105° C % | pH | Void** Vol. cc/g | Surface Area m²/g | Pore Vol.*** cc/g | Average Pore Diameter Å |
|---|---|---|---|---|---|---|---|---|---|
| 0.75 | 1.5 | 25 | 9.1 | 4.6 | 6.8 | 4.6 | 581 | 0.34 | 24 (median) |
| 1.1 | 1 | 92 | 6.8 | 3.7 | 9.7 | 1.8 | 280 | 0.3 | 18 |
| 1.0 | 3 | 113 | 10.0 | — | 7.4 | 1.5 | 26 | 0.02 | — |
| 1.0* | 4 | 793 | 7.1 | 3.3 | 7.5 | 2.0 | 39 | 0.03 | — |

*Intermittent Addition
**by Hg intrusion up to 5000 psi
***by Na absorption

The product had an ultimate particle size of 120 mu, a pH of 7.5 and an ignition loss of 9.8%. The product was highly dispersible and was useful in reinforcing rubber.

EXAMPLE 5

The process of Example 4 was repeated except that sodium hexametaphosphate was used. The product was the same as that produced by the method of Example 4.

I claim:

1. A method of precipitating finely divided silica having an ultimate particle size between 20 and 800 m$\mu$, loss on ignition between 6.5 and 10.5%, loss at 105° C between 3.0 and 5.0%, pH value of 6.5 to 10, void volume of 1.3 to 5.0 cc/g., surface area of 25 to 600 m²/g and pore volume of 0.01 to 0.4 cc/g. and having phosphate ions on the surface of said silica, said method comprising the steps of:
   a. forming a dilute solution of sodium slicate having a weight ratio of 1.5 to 4.0 $SiO_2$/1.0 $Na_2O$ and containing 0.01 to 0.05 g. of $Na_2O$/cc;
   b. heating the dilute silicate solution to a temperature between 80° and 100 ° C;
   c. adding 0.7 to 1.2 equivalents of phosphate salt per equivalent of $Na_2O$ to said heated solution while maintaining the temperature between 80° and 100° C for a period of 1.0 to 3.5 hours, thereby producing a slurry of silica;
   d. filtering, washing and reslurrying the silica with aqueous $NH_3$, and
   e. filtering, rewashing and drying to obtain the product.

2. The method of claim 1, wherein the phosphate salt is selected from the group consisting of sodium trimetaphosphate, sodium tripolyphosphate and sodium hexametaphosphate.

3. The method of claim 1, wherein the heating temperatures recited in steps (b) and (c) is between 85° and 98° C.

4. In the process for producing precipitated silica particles from an alkali metal silicate by addition of a precipitating agent, filtering, reslurrying the precipitate with an aqueous washing agent, filtering, washing and drying; the improvement whereby, the silica particles have surface phosphate ions thereon, and are characterized by a particle size between 20 and 800 m$\mu$, loss on ignition between 6.5 and 10.5%, loss at 105° C between 3.0 and 5.0%, pH value between 6.5 and 10, void volume of 1.3 to 5.0 cc/g, surface area of 25 to 600 m²/g and pore volume of 0.01 to 0.4 cc/g and comprising the steps of:
   a. forming a dilute solution of sodium silicate having a weight ratio of 1.5 to 4.0 $SiO_2$/1.0 $Na_2O$, and containing 0.01 to 0.05 g of $Na_2O$/cc;
   b. heating said solution to a temperature between 80° and 100° C;
   c. adding sufficient phosphate salt to said heated solution to obtain 0.7 to 1.2 equivalents of phosphate salt per equivalent of $Na_2O$, while maintaining the temperature between 80° and 100° C for a period of 1.0 to 3.5 hours, thereby producing a slurry of silica;
   d. filtering, washing and reslurrying the silica with aqueous $NH_3$, and then
   e. filtering, rewashing and drying to obtain the product.

5. The process of claim 4, wherein the phosphate salt is selected from the group consisting of sodium trimetaphosphate, sodium tripolyphosphate and sodium hexametaphosphate.

6. The process of claim 4, wherein the heating takes place between 85° and 98° C.